US011307972B2

(12) United States Patent
Reda

(10) Patent No.: US 11,307,972 B2
(45) Date of Patent: Apr. 19, 2022

(54) SYSTEM AND METHOD FOR SCALABLE AUTOMATED USER INTERFACE TESTING

(71) Applicant: Walmart Apollo, LLC, Bentonville, AR (US)

(72) Inventor: Renas Reda, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 161 days.

(21) Appl. No.: 16/252,255

(22) Filed: Jan. 18, 2019

(65) Prior Publication Data

US 2020/0233788 A1 Jul. 23, 2020

(51) Int. Cl.
*G06F 11/36* (2006.01)
*G06F 9/44* (2018.01)
*G06F 11/00* (2006.01)
*G06F 3/0484* (2013.01)
*G06F 11/34* (2006.01)

(52) U.S. Cl.
CPC ...... *G06F 11/3688* (2013.01); *G06F 11/3612* (2013.01); *G06F 11/3692* (2013.01)

(58) Field of Classification Search
CPC ............ G06F 11/3664; G06F 11/3684; G06F 11/3688; G06F 11/3672; G06F 11/3692; G06F 11/3612
See application file for complete search history.

(56) References Cited

U.S. PATENT DOCUMENTS

| | | | |
|---|---|---|---|
| 9,141,521 B2* | 9/2015 | Zhang | G06F 11/3684 |
| 9,424,169 B1* | 8/2016 | Galburt | G06F 11/3692 |
| 2003/0060973 A1* | 3/2003 | Mathews | G01C 21/26 701/410 |
| 2011/0288931 A1* | 11/2011 | Kuhn | G06Q 30/0251 705/14.49 |
| 2013/0212638 A1* | 8/2013 | Wilson | G06Q 50/26 726/1 |
| 2018/0039565 A1* | 2/2018 | Rajagopalan | G06F 3/0482 |
| 2018/0039567 A1* | 2/2018 | Rajagopalan | G06F 11/3672 |
| 2019/0138380 A1* | 5/2019 | D | G06F 11/0793 |

OTHER PUBLICATIONS

Amalfitano et al., "A GUI Crawling-based technique for Android Mobile Application Testing", in 2011 Fourth International Conference on Software Testing, Verification and Validation Workshops, Berlin, Germany, (Year: 2011).*
Pei et al., Effective GUI-oriented automated testing platform for pervasive computing software environment, 4 pages (Year: 2009).*

* cited by examiner

*Primary Examiner* — Thuy Dao
(74) *Attorney, Agent, or Firm* — Duane Morris LLP; Manita Rawat

(57) ABSTRACT

This application relates to systems and methods for providing automated testing of user interfaces. The system is configured to communicate with one or more client devices that each include a common user interface of an application and receive at least one request for identifying errors associated with the common user interface. The system also receives at least one constraint associated with one or more portions of the common user interface. The system then generates navigational state information associated with the at least one constraint and identifies errors using the generated navigational state information associated with the common user interface.

20 Claims, 10 Drawing Sheets

Oops, we're having temporary system issues. Please try back soon.
Session ID: 4568341e5395465ca1f04211c6d53e2

● Error is accurate
○ Error is not accurate

Click the ImageButton displaying: "Navigate up"

Click the Button displaying: "All"

Click the LinearLayout displaying: "Home"

Click the FrameLayout displaying: "Shop"

Click the LinearLayout displaying: "Office Storage"

Click the LinearLayout displaying: "Filing Cabinets"

Click the LinearLayout displaying: "white black text line font product angle blacka nd white rectangle"

Click the RelativeLayout displaying: "ROLLBACK"

Error is: "Oops, we're having temporary system issues. Please try back soon."

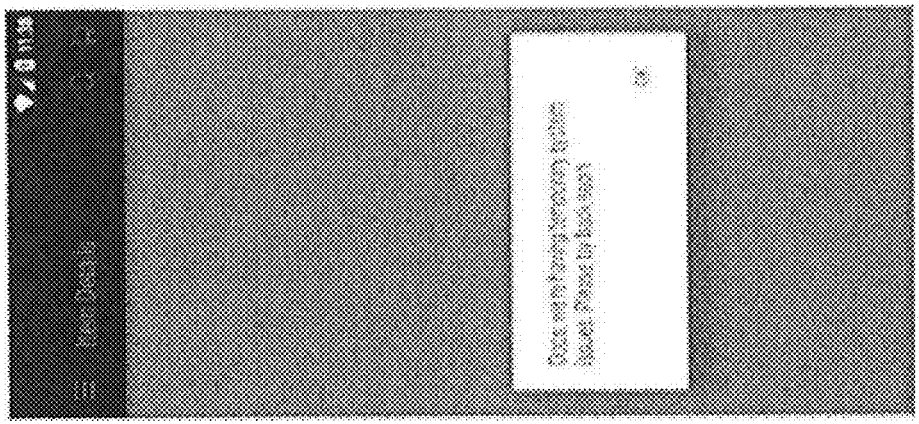

FIG. 6

SYSTEM AND METHOD FOR SCALABLE AUTOMATED USER INTERFACE TESTING

TECHNICAL FIELD

This application relates generally to user interface testing for applications. More specifically, the present disclosure is directed to systems and methods for providing automated testing of user interfaces by defining the types of errors associated with a user interface and constraints associated with portions of the user interface to be tested.

BACKGROUND

Applications for mobile platforms and other devices is increasing in demand at an astounding pace. Software development companies are responding to this increase in demand by rapidly introducing complex and evolving applications. These companies are routinely introducing innovative applications utilizing speedier and productive development means. However, testing the user interfaces is usually an afterthought—until it becomes apparent that the testing status quo is creating a bottleneck in development.

Traditionally, test cases are developed to identify errors in user interfaces for mobile applications. These test cases are slow and experience a lot of test flakiness. In other words, the tests do not function correctly across various user interfaces due to the wide disparity in application development. Test engineers developing user interface test cases experience significant struggles in developing the perfect test case for a specific user interface. This struggle stems from a lack of knowledge concerning the specific user interface elements for a given application. Traditionally, test engineers need to develop test cases specific for a user interface with a deep understanding of the specific elements of a user interface. User interfaces developed by test engineers to follow certain paths necessitate at least one or more assertions about the user interface to limit the amount of errors that identified. These assumptions are often inaccurate and either identify incorrect errors or fail to identify errors at all.

Further contributing to the problem of user interface test cases is the evolution and updating of applications. As user interface test cases are tightly coupled to the design of the user interface, test cases often need to be updated when the user interface changes. This process usually takes a considerable amount of time and requires many iterations as the application user interface is updated. If the test cases are not updated according to the user interface update, false positives of errors for the user interface will result. In some cases, application developers update the user interface and fail to update the user interface test case. When this occurs, the development team loses trust in the test cases because of the prevalence of many false positives. Often, test cases are ignored when they produce errors having many false positives.

SUMMARY

In various embodiments, a system including a computing device is disclosed. The computing device is configured communicate with one or more client device that each include a common user interface of an application. The system receives at least one request for identifying errors associated with the common user interface and at least one constraint associated with one or more portions of the common user interface. The system then generates navigational state information associated with the at least one constraint and identifies errors using the generated navigational state information associated with the common user interface.

In various embodiments, a non-transitory computer readable medium having instructions stored thereon is disclosed, wherein the instructions, when executed by the processor cause a device to perform the operations comprising communicating with one or more client device that each include a common user interface of an application. The processor further causes a device to receive at least one request for identifying errors associated with the common user interface and at least one constraint associated with one or more portions of the common user interface. The processor causes a device to perform the operations of generating navigational state information associated with the at least one constraint and identifying errors using the generated navigational state information associated with the common user interface.

In various embodiments, a method is provided including the steps of communicating with one or more client device that each include a common user interface of an application. Identifying errors associated with the common user interface and at least one constraint associated with one or more portions of the common user interface. Generating navigational state information associated with the at least one constraint and identifying errors using the generated navigational state information associated with the common user interface.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein:

FIG. 6 is an example of an error report in accordance with some embodiments of the present disclosure.

DETAILED DESCRIPTION

Figure 1A:
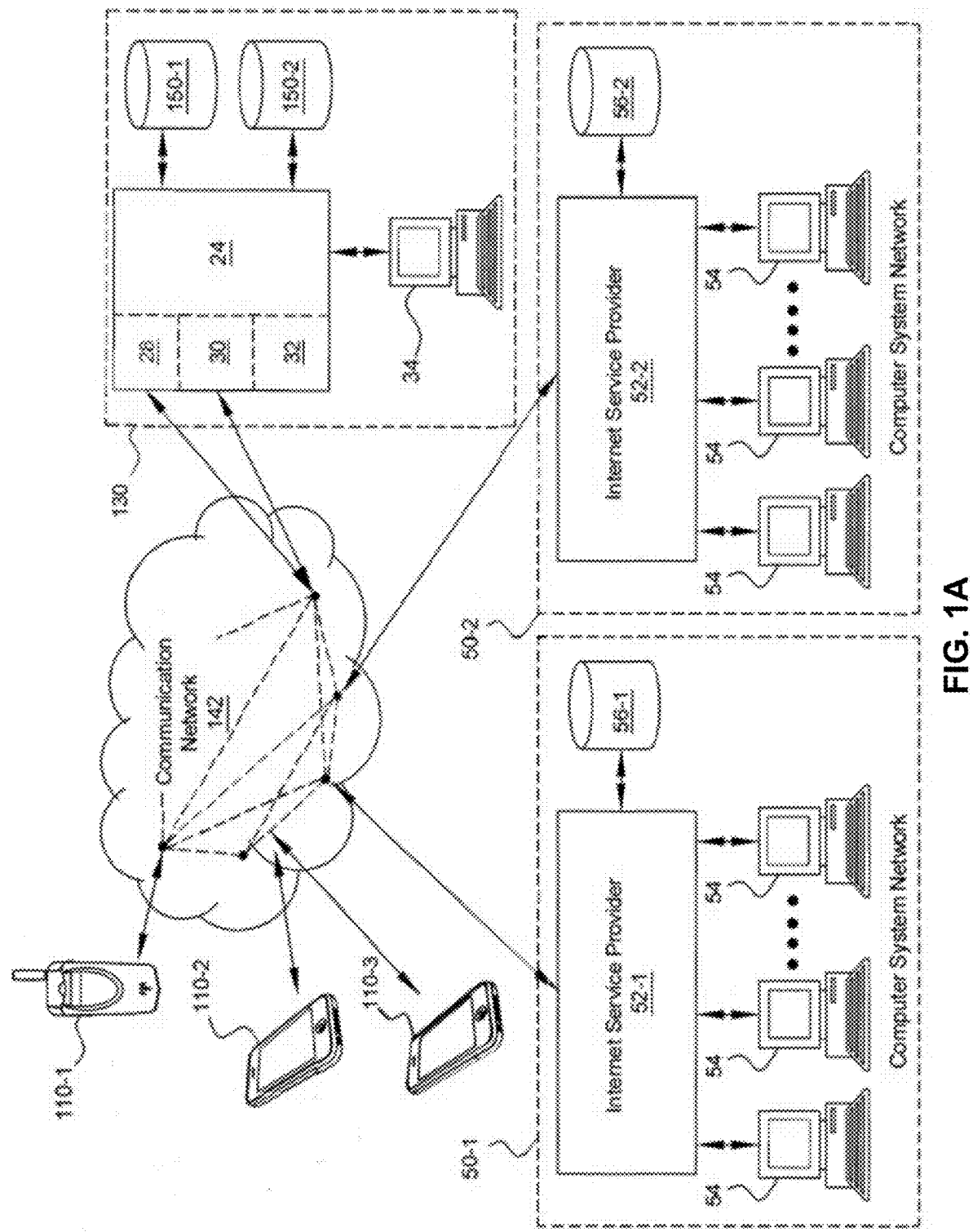
FIG. 1A illustrates one example of a system in accordance with some embodiments of the present disclosure.

The description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

The following description is provided as an enabling teaching of a representative set of examples. Many changes can be made to the embodiments described herein while still obtaining beneficial results. Some of the desired benefits discussed below can be obtained by selecting some of the features discussed herein without utilizing other features. Accordingly, many modifications and adaptations, as well as subsets of the features described herein are possible and can even be desirable in certain circumstances. Thus, the following description is provided as illustrative and is not limiting.

As used herein, use of a singular article such as "a," "an" and "the" is not intended to exclude pluralities of the article's object unless the context clearly and unambiguously dictates otherwise.

The embodiments described herein provide systems and methods for user interface automated testing by identifying error types instead of using test cases. In various embodiments described herein, a user interface system and methods are described that automatically generate navigational state information (e.g., paths) associated with a user interface for testing and identify errors based on the instructions for a search associated with the path. In some embodiments, credentials and other data associated with the test are also provided to the system for performing specific tests associated with the user interface. In various embodiments, the navigational state information (e.g., paths) are dynamically created using an identifier search program that assess a user interface for identifiers. In some embodiments, as will be explained in greater detail below, navigational state information may be generated utilizing a .yaml file to describe specific paths associated with identifiers in the user interface. In various embodiments, if the system identifiers an error it may indicate a notification to an administrator for verification. In this example, a notification may be provided or an indication may be provided on an error report for identifying the accuracy of the error. As will be understood by one of ordinary skill in the art, improving the accuracy of the error will improve the overall identification of future errors during subsequent searches for errors associated with the user interface. In various embodiments, the system is scalable in that various portions of a user interface may tested simultaneously using a plurality of client devices. In this example, the navigational state information for one device may differ across various devices to test the entirety of portions of the user interface identified in the constraints. In some embodiments, the navigational state information contains user interface segments which determines the search of a subset of portions of a user interface identified by the constraints. In other words, the interface segments are respectively associated with one respective client device.

Although the embodiments described herein illustrate automated user interface testing and error identification systems and methods used for improving user interface testing for a variety applications in a scalable manner, the embodiments discussed herein are not limited to such systems and methods, and one of ordinary skill in the art will appreciate that the current disclosure may be used in connection with any type of system or method that addresses various different types of interface testing problems.

FIG. 1A depicts an example of a system 100 in which a plurality of client devices 110-1, 110-2, and 110-3 (collectively "client devices 110") are connected via communication network 142 to one or more computer system networks 50-1, 50-2 ("communication networks 50"), and to a management server 130. Communication network 142 may be a wide area network ("WAN"), a local area network ("LAN"), a personal area network ("PAN"), or the like. In one embodiment, communication network 142 is the Internet and client devices 110 are online. "Online" may mean connecting to or accessing source data or information from a location remote from other devices or networks coupled to communication network 142.

Management server 130 includes a processing unit 24 coupled to one or more data storage units 150-1, 150-2 (collectively referred to as "database management system 150" or "DBMS 150"). The processing unit 24, in some embodiments is configured to provide front-end graphical user interfaces ("GUI") (e.g., client GUI and vendor GUI), and a back-end or administrative graphical user interface or portal to one or more remote computers 54 or to one or more local computers 34. In some embodiments, a client interface (not shown) is provided that accesses management server 130 via a GUI. The GUIs can take the form of, for example, a webpage that is displayed using a browser program local to remote computers 54 or to one or more local computers 34. It is understood that the system 100 may be implemented on one or more computers, servers, or other computing devices. In some embodiments, the GUI may be displayed on client devices 110 via a software application. For example, system 100 may include additional servers programmed or partitioned based on permitted access to data stored in DBMS 150. As used herein, "portal" is not limited to general-purpose Internet portals, such as YAHOO! ("YAHOO!" is a registered trademark of Oath Holdings Inc. of Sunnyvale, Calif.) or GOOGLE ("GOOGLE" and the Google Logo are registered trademarks of Google LLC of Mountain View, Calif.), but also includes GUIs that are of interest to specific, limited audiences and that provide the party access to a plurality of different kinds of related or unrelated information, links, apps and tools as described below. "Webpage" and "website" may be used interchangeably herein.

Remote computers 54 may be part of a computer system network 50-1, 50-2 and gain access to communication network 142 through an Internet service provider ("ISP") 52-1, 52-2 ("ISPs 52"). Client devices 110 may gain access to communications network 142 through a wireless cellular communication network, a WAN hotspot, or through a wired or wireless connection with a computer as will be understood by one skilled in the art. Clients and vendors, as described below, may use remote computers 54 and/or client devices 110 to gain access to system 100.

In one embodiment, client devices 110 includes any mobile device capable of transmitting and receiving wireless signals. Examples of mobile instruments include, but are not limited to, mobile or cellular phones, personal digital assistants ("PDAs"), laptop computers, tablet computers, music players, and e-readers, to name a few possible devices.

In various embodiments, as described in further detail below, client devices 110 are configured to display dynamic forms or GUIs as part of user interface testing. In some embodiments, management server 130 of system 100 is configured to crawl or search a user interface associated with client device 110. Alternatively, GUIs may provide for manual input of information into the forms.

Figure 1B:
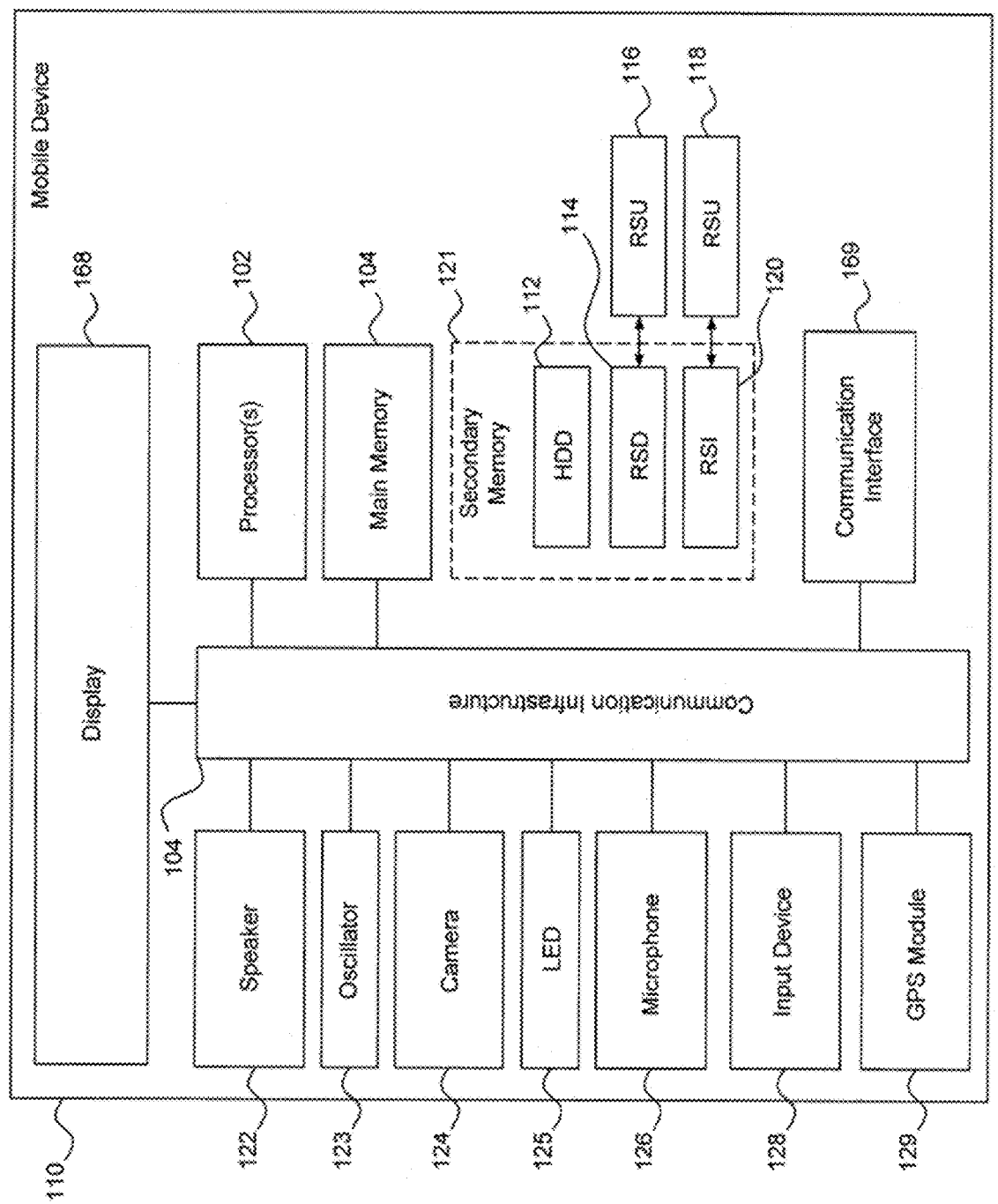
FIG. 1B illustrates one example of an architecture of a mobile device in accordance with some embodiments of the present disclosure.

FIG. 1B is a block diagram of one example of an architecture of client device 110. As shown in FIG. 1B, client device 110 includes one or more processors, such as processor(s) 102. Processor(s) 102 may be any central processing unit ("CPU"), microprocessor, micro-controller, or computational device or circuit for executing instructions. Processor(s) are connected to a communication infrastructure 104 (e.g., a communications bus, cross-over bar, or network). Various software embodiments are described in terms of this exemplary mobile device 110. After reading this description, it will be apparent to one of ordinary skill in the art how to implement the method using client devices 110 that include other systems or architectures. One of ordinary skill in the art will understand that computers 34 and 54 may have a similar and/or identical architecture as that of client devices 110. Put another way, computers 34 and 54 can include some, all, or additional functional components as those of the client device 110 illustrated in FIG. 1B.

Client device 110 includes a display 168 that displays graphics, video, text, and other data received from the communication infrastructure 104 (or from a frame buffer not shown) to a user (e.g., a subscriber, commercial user, back-end user, or other user). Examples of such displays 168 include, but are not limited to, LCD screens, OLED display, capacitive touch screen, and a plasma display, to list only a few possible displays. Client device 110 also includes a main memory 108, such as a random access ("RAM") memory, and may also include a secondary memory 110. Secondary memory 110 may include a more persistent memory such as, for example, a hard disk drive ("HDD") 112 and/or removable storage drive ("RSD") 114, representing a magnetic tape drive, an optical disk drive, solid state drive ("SSD"), or the like. In some embodiments, removable storage drive 114 reads from and/or writes to a removable storage unit ("RSU") 116 in a manner that is understood by one of ordinary skill in the art. Removable storage unit 116 represents a magnetic tape, optical disk, or the like, which may be read by and written to by removable storage drive 114. As will be understood by one of ordinary skill in the art, the removable storage unit 116 may include a tangible and non-transient machine readable storage medium having stored therein computer software and/or data.

In some embodiments, secondary memory 110 may include other devices for allowing computer programs or other instructions to be loaded into client device 110. Such devices may include, for example, a removable storage unit ("RSU") 118 and a corresponding interface ("RSI") 120. Examples of such units 118 and interfaces 120 may include a removable memory chip (such as an erasable programmable read only memory ("EPROM")), programmable read only memory ("PROM")), secure digital ("SD") card and associated socket, and other removable storage units 118 and interfaces 120, which allow software and data to be transferred from the removable storage unit 118 to client device 110.

Client device 110 may also include a speaker 122, an oscillator 123, a camera 124, a light emitting diode ("LED") 125, a microphone 126, an input device 128, and a global positioning system ("GPS") module 129. Examples of input device 128 include, but are not limited to, a keyboard, buttons, a trackball, or any other interface or device through a user may input data. In some embodiment, input device 128 and display 168 are integrated into the same device. For example, display 168 and input device 128 may be touchscreen through which a user uses a finger, pen, and/or stylus to input data into client device 110.

Client device 110 also includes one or more communication interfaces 169, which allows software and data to be transferred between client device 110 and external devices such as, for example, another client device 110, a computer 34, 54 and other devices that may be locally or remotely connected to mobile device 100. Examples of the one or more communication interfaces 169 may include, but are not limited to, a modem, a network interface (such as an Ethernet card or wireless card), a communications port, a Personal Computer Memory Card International Association ("PCMCIA") slot and card, one or more Personal Component Interconnect ("PCI") Express slot and cards, or any combination thereof. The one or more communication interfaces 169 may also include a wireless interface configured for short-range communication, such as near field communication ("NFC"), Bluetooth, or other interface for communication via another wireless communication protocol. As briefly noted above, one of ordinary skill in the art will understand that computers 34, 54 and portions of system 100 may include some or all components of client device 110.

Software and data transferred via the one or more communications interfaces 169 are in the form of signals, which may be electronic, electromagnetic, optical, or other signals capable of being received by communications interfaces 169. These signals are provided to communications interface 169 via a communications path or channel. The channel may be implemented using wire or cable, fiber optics, a telephone line, a cellular link, a radio frequency ("RF") link, or other communication channels.

In this document, the terms "non-transitory computer program medium" and "non-transitory computer readable medium" refer to media such as removable storage units 116, 118, or a hard disk installed in hard disk drive 112. These computer program products provide software to client device 110. Computer programs (also referred to as "computer control logic") may be stored in main memory 108 and/or secondary memory 110. Computer programs may also be received via the one or more communications interfaces 169. Such computer programs, when executed by a processor(s) 102, enable the client device 110 to perform the features of the method discussed herein.

Figure 2:
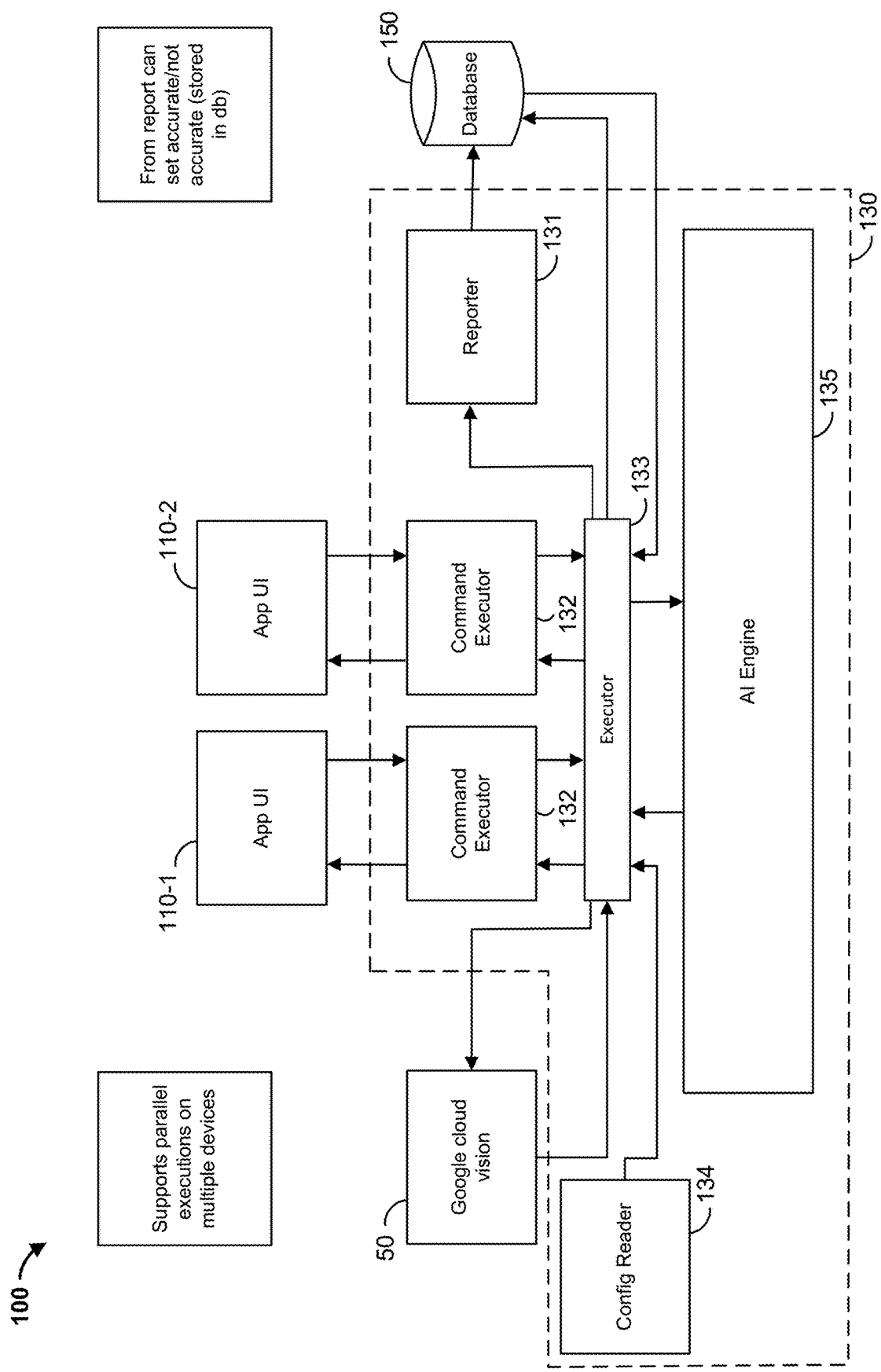
FIG. 2 is a diagram of various system components in accordance with some embodiments of the present disclosure.

FIG. 2 is a diagram of various system components in accordance with some embodiments of the present disclosure. In various embodiments, system 100 may be a computing environment including one or more client devices 110, management server 130, one or more software management modules 131, 132, 133, 134, and 135 database management system 150, and communication network 142 connecting various components of system 100. Although two client devices 110-1 and 110-2 are shown in FIG. 2, any number of client devices may be present. In various embodiments, client device 110 is a user device capable of connecting to the Internet or similar network as will be described below. In some embodiments, at least one client device is running an application comprising a user interface for testing on system 100. In various embodiments, as will be described in further detail below, at least one computer system network 50 is a system for determining user interface identifiers associated with elements of user interface that can be testes using system 100. In this example, the computer system network may be associated with Google Cloud Vision API ("GOOGLE" and the Google Logo are registered trademarks of Google LLC of Mountain View, Calif.), that detects and extracts images in the user interface to determine testable elements of the interface.

In various embodiments, management server 130 may comprise a reporter engine. In some embodiments, the reporter engine generates reports associated with errors identified in the user interface of an application. In various embodiments, the reporter engine updates the accuracy of errors associated with a user interface and maintains a status of up-to-date error information in DBMS 150. In some embodiments, management server 130 may comprise an AI engine 135 which dynamically created navigational state information (e.g., a path) associated with constraints for searching or evaluating portions of a user interface to be tested. In this example, AI engine 135 generated navigational state information according to the request or determines navigational state information associated with a specific path identified by a file via config reader 134. In this example, a specific path may be identified by a .yaml file. However, one of ordinary skill in the art would appreciated that there are various means of directing the creation of navigational state information to identify portions of a user interface for testing.

In some embodiments, system 100 may comprise a printer (not shown) communicatively coupled to system 100 and/or client device 110. A printer may be any printing device that is used to generate user interface error reports or statistical information associated with errors identified in the testing of a user interface.

In various embodiments, as shown in FIGS. 1A-B, and 2, client device 110 may include a computing device such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), or any other suitable computing device configured to store data and software instructions, execute software instructions to perform operations, and/or display information on a display device. Client device 110 may be associated with one or more users (not shown). For example, a user operates client device 110, causing it to perform one or more operations in accordance with various embodiments.

Client device 110 includes one or more tangible, non-transitory memories that store data and/or software instructions, and one or more processors configured to execute software instructions. Client device 110 may include one or more display devices that display information to a user and one or more input devices (e.g., keypad, keyboard, touchscreen, voice activated control technologies, or any other suitable type of known input device) to allow the user to input information to the client device. Client device 110 processor(s) may be any central processing unit ("CPU"), microprocessor, micro-controller, or computational device or circuit for executing instructions. Processor(s) are connected to a communication infrastructure (e.g., a communications bus, cross-over bar, or network). Various software embodiments are described in terms of this exemplary client device 110. After reading this description, it will be apparent to one of ordinary skill in the art how to implement the method using client device 110 that include other systems or architectures. One of ordinary skill in the art will understand that computers may have a similar and/or identical architecture as that of client device 110. Put another way, computers can include some, all, or additional functional components as those of the client device 110 illustrated in FIGS. 1A-B, and 2.

Embodiments of the subject matter described in this specification can be implemented in a system 100 that includes a back end component, e.g., as a data server, or that includes a middleware component, e.g., an application server, or that includes a front end component (e.g., a client device 110) having a graphical user interface or a Web browser through which a user can interact with an implementation of the subject matter described is this specification, or any combination of one or more such back end, middleware, or front end components. The components of the system can be interconnected by any form or medium of digital data communication, (e.g., a communication network 142). Communications network 142 may include one or more communication networks or media of digital data communication. Examples of communication network 142 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet and combinations thereof. In accordance with various embodiments of the present disclosure, communications network 142 may include the Internet and any publicly accessible network or networks interconnected via one or more communication protocols, including, but not limited to, a Uniform Resource Locator (URL), hypertext transfer protocol (HTTP) and HyperText Transfer Protocol Secured (HTTPS) and Secured Socket Layer/Transport Layer Security (SSL/TLS) and transmission control protocol/internet protocol (TCP/IP). Communications protocols in accordance with various embodiments also include protocols facilitating data transfer using radio frequency identification (RFID) communications and/or NFC. Moreover, communications network 142 may also include one or more mobile device networks, such as a GSM or LTE network or a PCS network, allowing a client device to send and receive data via applicable communications protocols, including those described herein. For ease of illustration, communication network 142 is shown as an extension of management server 130.

A client device 110 and server 130 are generally remote from each other and typically interact through a communication network 142. The relationship of client device 110 and management server 130 arises by virtue of computer programs running on the respective system components and having a client-server relationship to each other. System 100 may include a web/application server (not shown) in embodiments used to gain access to many services provided by management server 130.

According to various embodiments, management server 130 is configured to execute automated user interface testing on at least one client device 110. For example, according to various embodiments, system 100 is configured to receive a request for automated user interface testing by receiving types of errors associated with a user interface. For example, a user interface test may encompass various fields for testing (e.g., search field, login field, email field, scroll field, etc.). In some implementations, fields are associated with a resource ID or identifier that identifies the type of user interface element that is being tested. One of ordinary skill in the art would understand that a user interface has a various fields or elements that may be tested for error identification using embodiments described in this application.

In various embodiments, fields or elements a user interface for testing are automatically or dynamically identified visually. In some embodiments, fields or elements of a user interface are identified using Google Cloud Vision API ("GOOGLE" and the Google Logo are registered trademarks of Google LLC of Mountain View, Calif.). In this example, user interface fields or elements are identified and navigational state information (e.g., a path) is generated that identifies how an error capture tool is executed. In some embodiments, AI engine 135 scrolls or crawls a page according to the navigational state information to test the fields or elements of a user interface identified using Google Cloud Vision API ("GOOGLE" and the Google Logo are registered trademarks of Google LLC of Mountain View, Calif.).

Although Google Cloud Vision API ("GOOGLE" and the Google Logo are registered trademarks of Google LLC of Mountain View, Calif.) is described as identifying fields or elements of a user interface to be tested, a person of ordinary skill in the art would understand that any similar visual field identification program may be suitable for identifying fields or elements of a user interface.

As described above, system 100 may comprise remote computers 54 that may be part of a computer system network 50-1, 50-2 and gain access to communication network 142 through an Internet service provider ("ISP") 52-1, 52-2 ("ISPs 52"). In various embodiments, computer system networks 50-1, 50-2 may represent cloud vision technology for visually identifying fields or elements of a user interface. In various embodiments, management server 130 is configured to initiate an automated user interface test on client device 110. In this example, error types to search and portions of the user interface for testing are identified. In various examples, the system 100 identifies every user interface field or element (e.g., component) to be tested at every user interface interaction of the application. In this example, system 100 crawls the user interface to systematically test every user interface interaction associated with the error types and portions of the user interface identified for testing. In some embodiments, a portion may be the entire user interface. In various embodiments, all error types may be identified to search for in a given user interface.

In various embodiments, management server 130 is configured to generate and/or record statistical/historical information relating to the errors associated with a user interface search. In some embodiments, management server 130 is configured to generate a report associated with a user interface search.

In some embodiments, navigational state information may be generated using a Java Script Object Notation ("JSON") payload. It should be appreciated, that one of ordinary skill in the art will understand that navigational state information may be generated using various software and/or hardware implementations such as YAML, BSON, MessagePack and the like.

Figure 3:
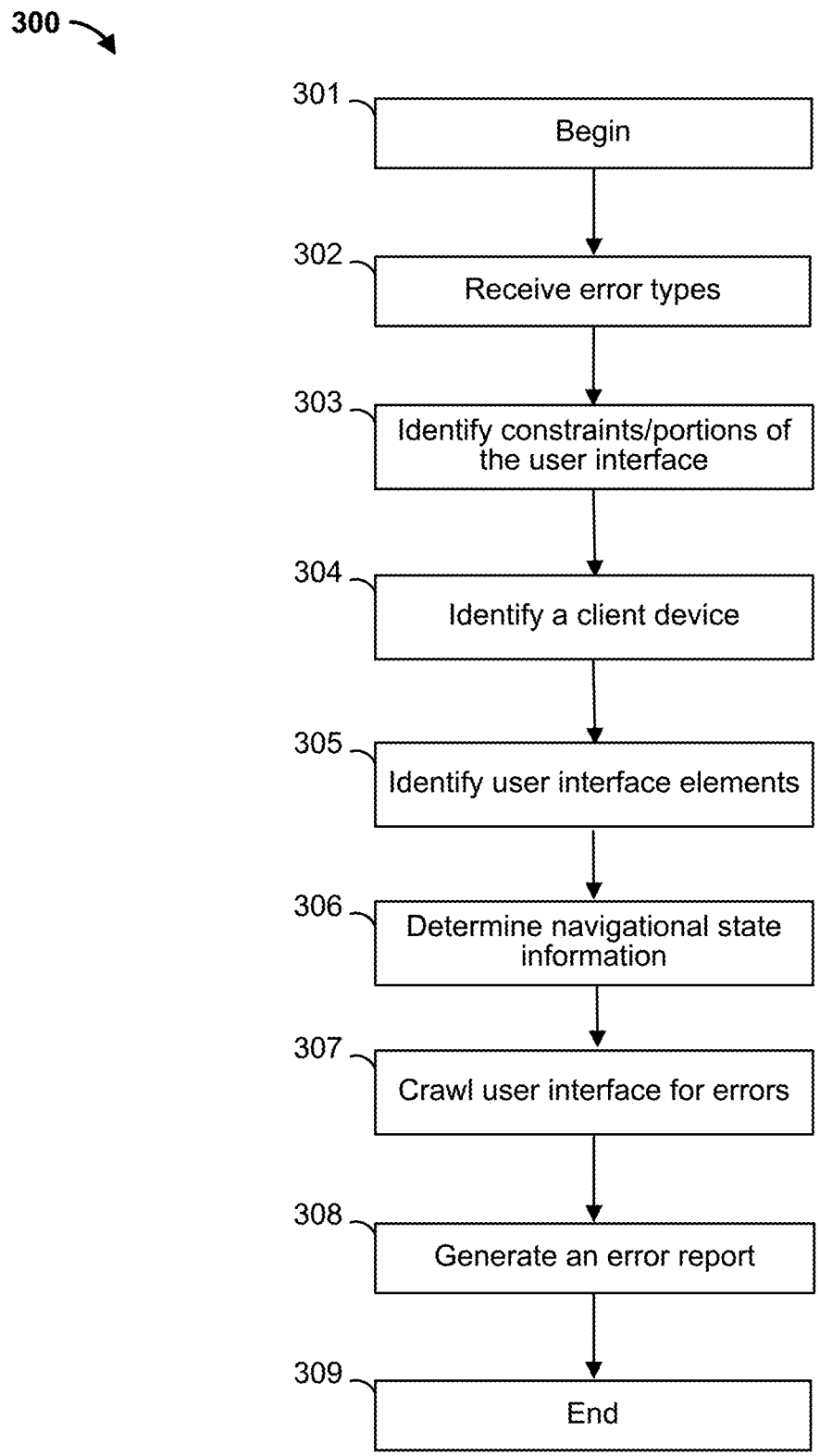
FIG. 3 is a flowchart illustrating an example of user interface testing in accordance with some embodiments of the present disclosure.

FIG. 3 is a flowchart illustrating an example process 300 of automated user interface testing that may be used with the system 100 described above in accordance with some embodiments of the present disclosure. At 301, the automated user interface testing process begins. At 302, the error types associated with a user interface are received. In various embodiments, the error types may be associated with identifiers of a user interface field or element. In some embodiments, the error types may be identified using a .yaml or similar file for identifying specific identifiers associated with a field or element of a user interface. At 303, a portion of a user interface is identified to be tested. In some embodiments, the entire user interface of an application is identified. At 304, a client device 110 having an application for the user interface to be tested is identified. At 305, the user interface is visually scanned to identify a plurality of user interface elements that may be tested. In various embodiments, this scan occurs using a network management service 50-1 running Google Cloud Vision API ("GOOGLE" and the Google Logo are registered trademarks of Google LLC of Mountain View, Calif.) or similar service. In some embodiments, Google Cloud Vision API ("GOOGLE" and the Google Logo are registered trademarks of Google LLC of Mountain View, Calif.) may be executed by management server 130. At 306, navigational state information (e.g., a path) is identified associated with the identified user interface elements of step 305. In this embodiment, the navigational state information is further associated with the portions of the user interface identified for testing. At step 307, the user interface is crawled (e.g., scanned) according to the navigational state information associated with the error types and portions of the user interface identified at steps 302 and 303. At step 308, a report is generated identifying errors in the user interface associated with step 306. At step 309, the automated user interface testing process ends.

Figure 4:
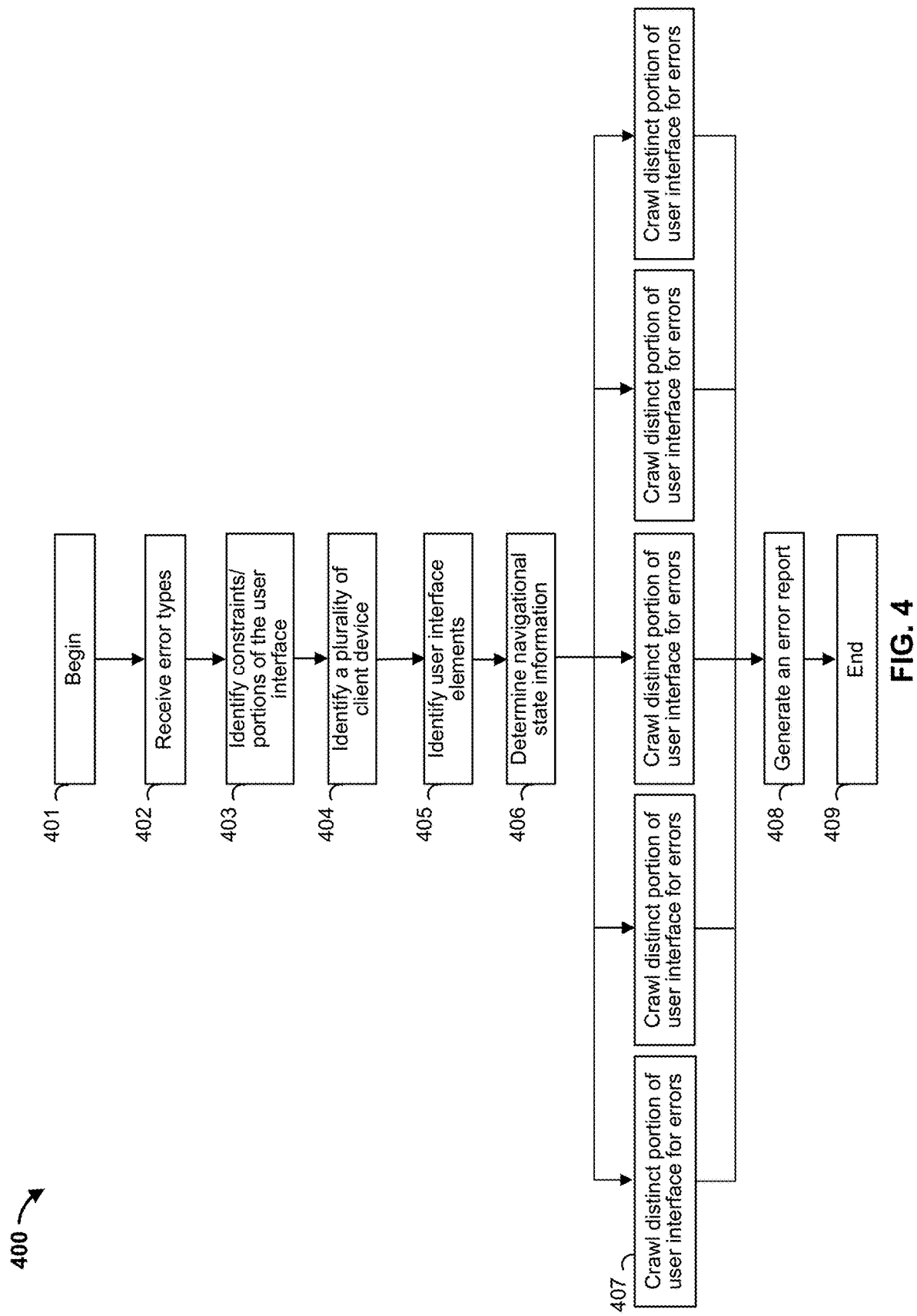
FIG. 4 is a flowchart illustrating an example of user interface testing using a plurality of client devices in accordance with some embodiments of the present disclosure.
Figure 5A:
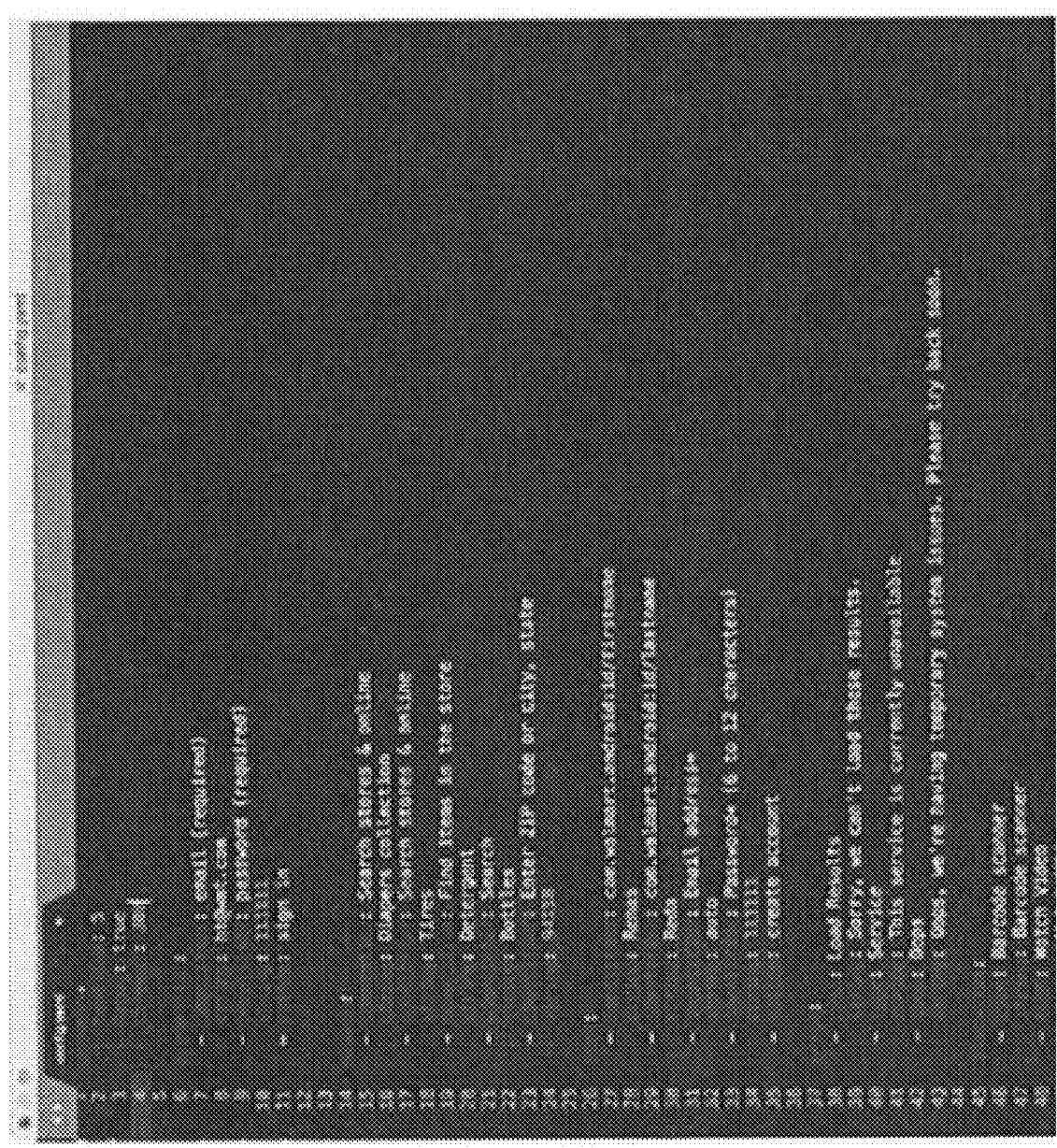
FIGS. 5A-5D are example files associated with identifying user interface identifiers in accordance with some embodiments of the present disclosure.
Figure 5B:
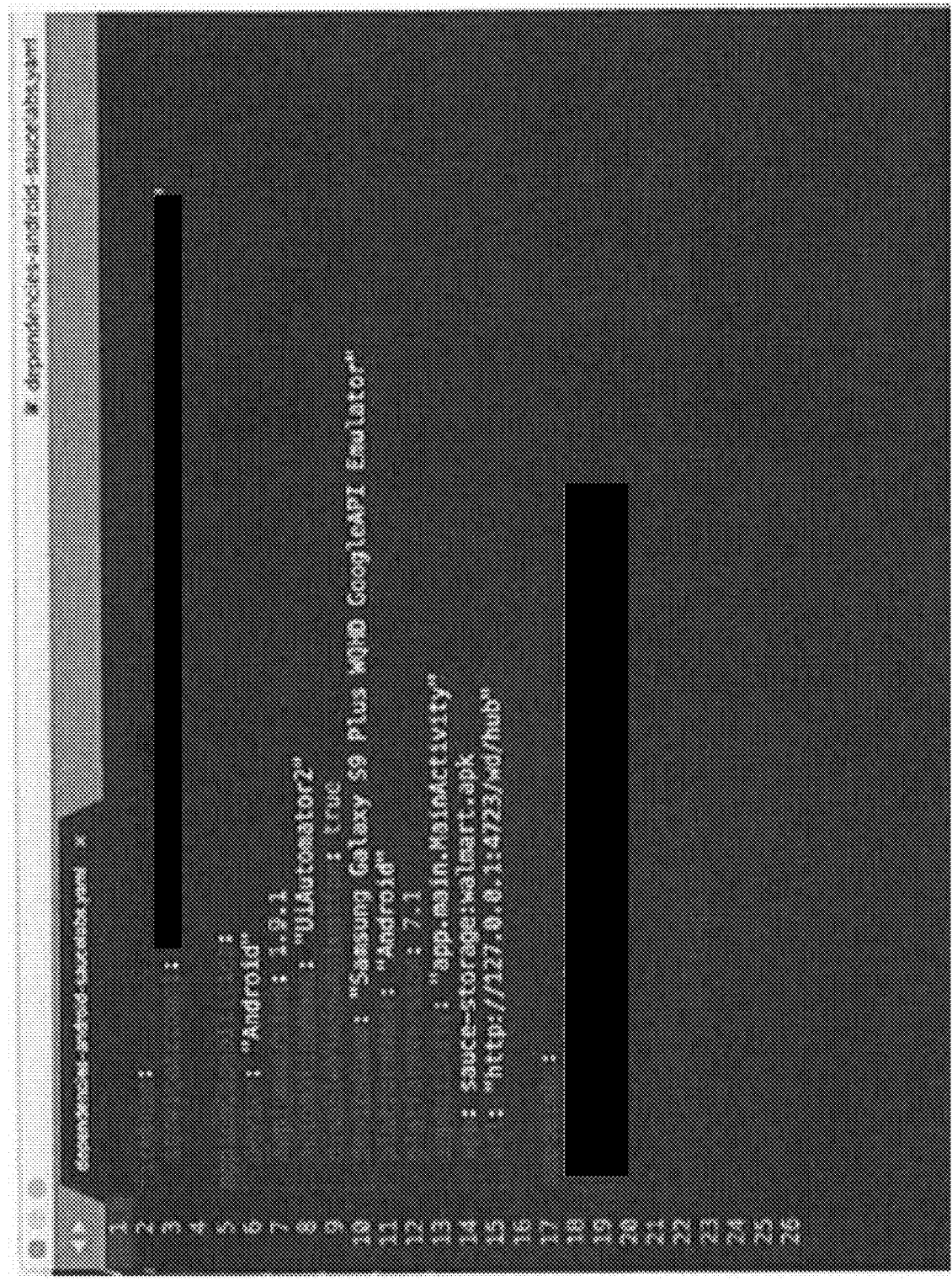
Figure 5C:
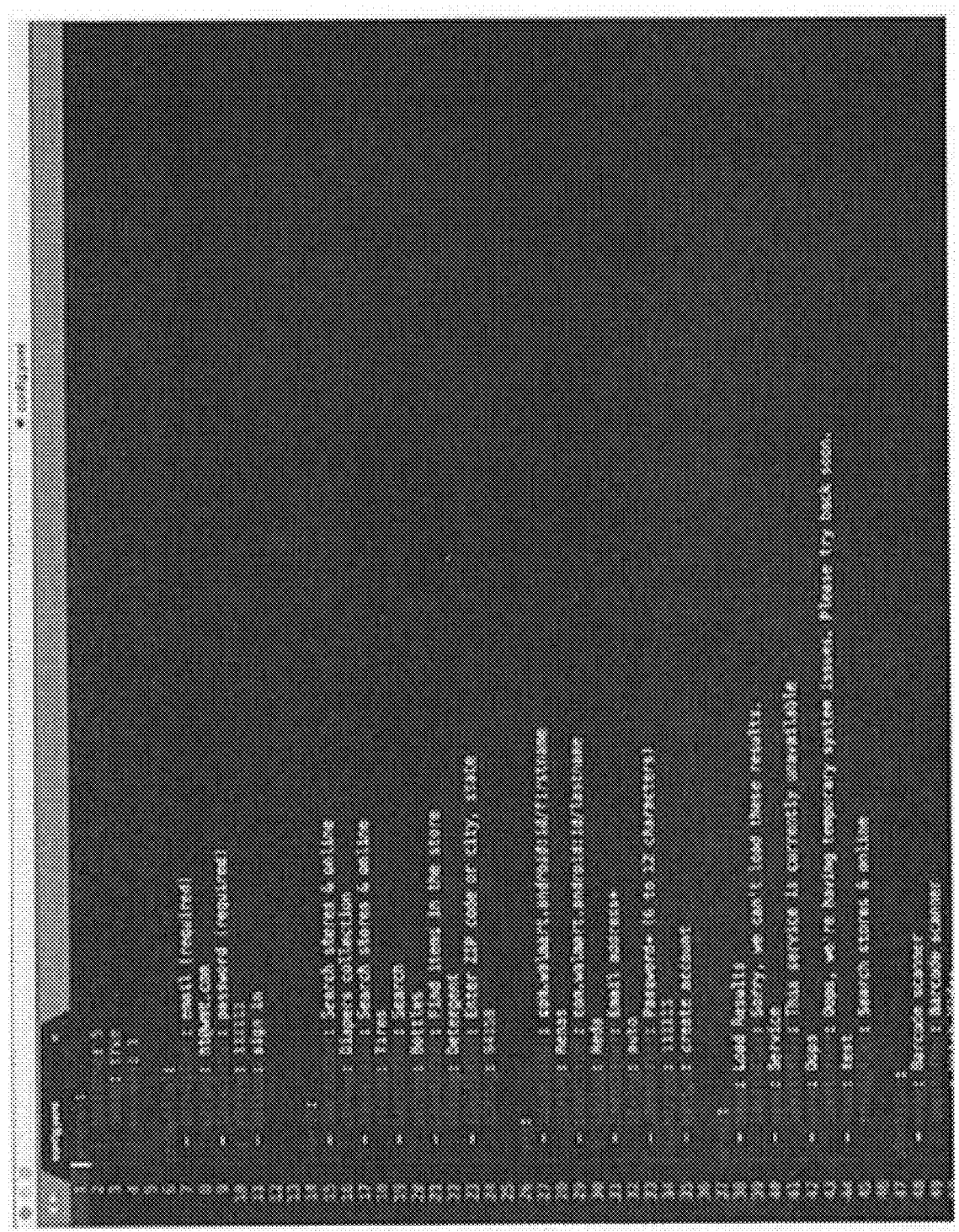
Figure 5D:
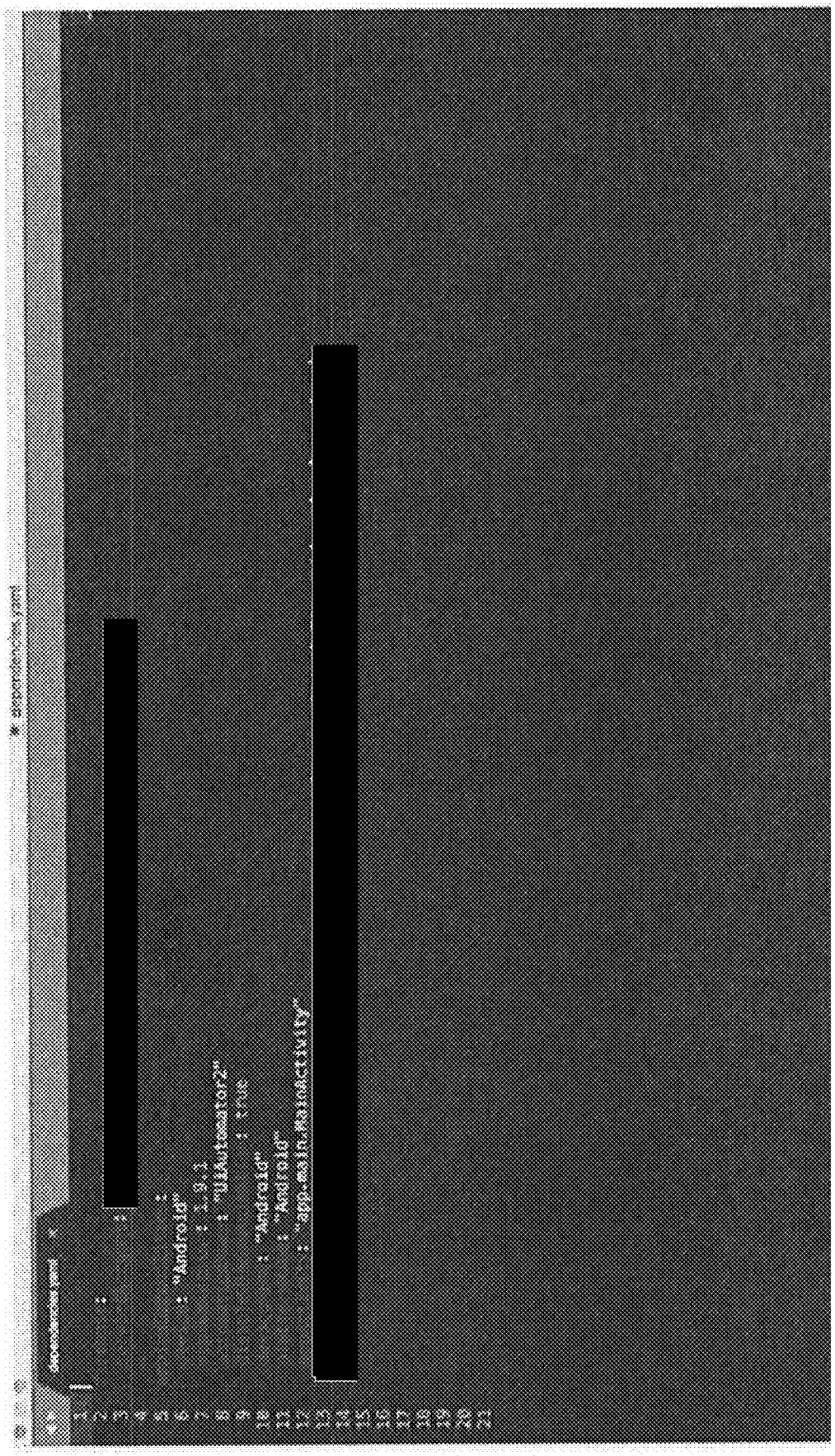

FIG. 4 illustrates an example process 400 of user interface testing using a plurality of client devices 110 that may be used with system 100 described above in accordance with some embodiments of the present disclosure. At step 401, the user interface testing using a plurality of client devices 110 begins. At 402, the error types associated with a user interface are received. In various embodiments, the error types may be associated with identifiers of a user interface field or element. In some embodiments, the error types may be identified using a .yaml or similar file for identifying specific identifiers associated with a field or element of a user interface. At 403, a portion of a user interface is identified to be tested. In some embodiments, the entire user interface of an application is identified. At 404, a plurality of client devices 110 having an application for the user interface to be tested are identified. In this example, the user interface testing will occur over a plurality of client devices running a plurality of the same application identified for the user interface to be test. At 405, the user interface is visually scanned to identify a plurality of user interface elements that may be tested. At 406, a plurality of navigational state information is identified for each respective client device 110 according to interface segment. In this embodiment, a distinct portion of the user interface corresponds to a distinct interface segment of the navigational state information for a respective client device 110. Thus, when the portion of a user interface for one client device 110 is tested, a different portion of a user interface for different client device 110 is tested simultaneously because the interface segments for each client device are different. In other words, in some embodiments, each interface segment within the navigational state information is different but still constrained by the error types and portions of the user interface identified for testing in steps 402 and 403. At step 407, the user interface for a respective client device is crawled (e.g., scanned) according to the respective interface segment of the navigational state information dynamically generated at step 406 and associated with the error types and portions of the user interface identified at steps 402 and 403. In some embodiments, the navigational state information contains user interface segments which determines the search of a subset of portions of a user interface identified by the constraints. In other words, the interface segments are respectively associated with one respective client device. At step 408, a report is generated identifying errors in the user interface associated with step 407. At step 409, the automated user interface testing process ends.

FIGS. 5A-5D are example user interface .yaml files in accordance with some embodiments of the present disclosure. FIG. 6 is an example error report in accordance with some embodiments of the present disclosure.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. The computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system, comprising:
   a computing device including:
      a communication interface configured to communicate with one or more devices, over a communication network, the one or more client devices each include a common user interface of an application; and
      one or more processors, and a set of memory resources to store a set of instructions, that when executed by the one or more processors cause the computing device to:
         receive a data file including data identifying one or more identifiers, each identifier of the one or more identifiers being associated with an element of the common user interface and an error type;
         receive at least one constraint, the at least one constraint identifying one or more portions of the common user interface for testing;
         generate navigational state information for the one or more portions of the common user interface based on the at least one constraint and the data file, the navigational state information being associated with one or more error types, and indicating one or more error types to search and the one or more portions of the common user interface to test; and
         identify errors within the one or more portions of the common user interface using the generated navigational state information corresponding to each of the one or more portions of the common user interface and associated with the error types.

2. The system of claim 1, wherein the identifying errors occurs by crawling the common user interface using the generated navigational state information.

3. The system of claim 2, wherein the one or more client devices crawl the common user interface to identify errors, using the generated navigational state information.

4. The system of claim 3, wherein the navigational state information identifies at least one or more interface segments of the common user interface.

5. The system of claim 4, wherein one respective interface segment of the at least one or more interface segments is only associated with one respective client device of the one or more client devices.

6. The system of claim 5, wherein the one or more client devices comprise at least two client devices, and wherein the at least two client devices identify errors associated with the common user interface simultaneously according to each of the at least two client devices respective interface segment.

7. The system of claim 1, wherein generating navigational state information occurs by at least in part by scanning the portions of the common user interface for the one or more identifiers.

8. The system of claim 1, wherein the computing device is further configured to maintain statistics associated with the errors identified in the one or more portions of the common user interface.

9. The system of claim 1, wherein the computing device is further configured to generate a report associated with the errors identified in the one or more portions of the common user interface.

10. The system of claim 7, wherein the computing device is further configured to receive credential information associated with the one or more identifiers of the common user interface.

11. A non-transitory computer readable medium having instructions stored thereon, wherein the instructions, when executed by a processor of a computing device causes the computing device to:
  communicate with one or more client devices that each include a common user interface of an application;
  receive a data file including data identifying one or more identifiers, each identifier of the one or more identifiers being associated with an element of the common user interface and an error type;
  receive at least one constraint, the at least one constraint identifying one or more portions of the common user interface for testing;
  generate navigational state information for the one or more portions of the common user interface based on the at least one constraint and the data file, the navigational state information being associated with one or more error types, and indicating one or more error types to search and the one or more portions of the common user interface to test; and
  identify errors within the one or more portions of the common user interface using the generated navigational state information corresponding to each of the one or more portions of the common user interface and associated with the error types.

12. The non-transitory computer readable medium of claim 11, wherein identifying errors occurs by crawling the common user interface using the generated navigational state information.

13. The non-transitory computer readable medium of claim 12, wherein the one or more client devices crawl the common user interface to identify errors, using the generated navigational state information.

14. The non-transitory computer readable medium of claim 13, wherein the navigational state information identifies at least one or more interface segments of the common user interface.

15. The non-transitory computer readable medium of claim 14, wherein one respective interface segment of the at least one or more interface segments is only associated with one respective client device of the one or more client devices.

16. The non-transitory computer readable medium of claim 15, wherein the one or more client devices comprise at least two client devices, wherein the at least two client devices identify errors associated with the common user interface simultaneously according to each of the at least two client devices respective interface segment.

17. The non-transitory computer readable medium of claim 11, wherein generating navigational state information occurs by at least in part by scanning the portions of the common user interface for the one or more identifiers.

18. The non-transitory computer readable medium of claim 11, wherein the instructions, when executed by the processor, cause the device to perform further operations comprising: maintain statistics associated with the errors identified in the one or more portions of the common user interface.

19. A method, comprising:
  communicating with one or more client devices that each include a common user interface of an application;
  receiving a data file including data identifying one or more identifiers, each identifier of the one or more identifiers being associated with an element of the common user interface and an error type;
  receiving at least one constraint, the at least one constraint identifying one or more portions of the common user interface for testing;
  generating navigational state information for the one or more portions of the common user interface based on the at least one constraint and the data file, the navigational state information being associated with one or more error types, and indicating one or more error types to search and the one or more portions of the common user interface to test; and
  identifying errors within the one or more portions of the common user interface using the generated navigational state information corresponding to each of the one or more portions of the common user interface and associated with the error types.

20. The method of claim 19, wherein the identifying errors occurs by crawling the common user interface using the generated navigational state information.

* * * * *